United States Patent

Merhar

[15] 3,701,903
[45] Oct. 31, 1972

[54] PIEZOELECTRIC VEHICLE IMPACT SENSOR

[72] Inventor: Donald M. Merhar, Shorewood, Minn.

[73] Assignee: Honeywell Inc., Minneapolis, Minn.

[22] Filed: Oct. 29, 1970

[21] Appl. No.: 85,123

[52] U.S. Cl. ..................307/9, 310/8.1, 310/8.3, 280/150 AB, 340/52 H, 102/70.2
[51] Int. Cl. ..................................................B60l 3/00
[58] Field of Search..............310/8, 8.1, 8.4, 8.7, 9.1; 318/116, 118, 120–133; 73/67.1, 67.2; 323/22 SC, 22 Z; 307/251, 252 R, 9, 10; 340/52 H; 180/82, 103, 104; 280/150 AB; 102/70.2

[56] References Cited

UNITED STATES PATENTS

| | | | |
|---|---|---|---|
| 3,588,142 | 6/1971 | Gorman | 280/150 AB |
| 3,440,517 | 4/1969 | Page et al. | 323/22 X |
| 3,470,458 | 9/1969 | Corey | 323/22 |
| 3,389,275 | 6/1968 | Brothers | 310/9.1 X |
| 3,122,690 | 2/1964 | Dion et al. | 318/128 |
| 3,130,329 | 4/1964 | Cother | 310/8.1 |
| 3,356,868 | 12/1967 | Cother | 310/8.4 |
| 3,444,390 | 5/1969 | Breidenbach et al. | 310/8.1 X |

Primary Examiner—Lewis H. Myers
Assistant Examiner—Stanley J. Witkowski
Attorney—Charles J. Ungemach, Donald T. Reiling and Albin Medved

[57] ABSTRACT

A piezoelectric vehicle impact sensor which is responsive to changes in the vehicle's velocity caused by particular impacts upon the vehicle from predetermined directions relative to the vehicle. A piezoelectric crystal which has a sensitive axis is firmly attached within the vehicle. A mass is mounted within the vehicle for compressing the crystal along the sensitive axis in response to an impact from the predetermined directions, thereby causing the crystal to generate a voltage as a function of the impact. A voltage limiter limits the amplitude of the voltage to a predetermined level. An integrating circuit receives the voltage from the voltage limiter and produces a signal which is an integral of that voltage. A detecting circuit is responsive to a particular value of the signal from the integrating circuit for activating an apparatus such as an inflatable passenger restraining system.

6 Claims, 4 Drawing Figures

PIEZOELECTRIC VEHICLE IMPACT SENSOR

BACKGROUND OF THE INVENTION

The present invention is a piezoelectric impact sensor which may be used for activating an inflatable passenger restraining system within a vehicle in response to particular types of impacts that may occur from a plurality of predetermined directions relative to the vehicle.

The purpose of the inflatable passenger restraining system is to prevent injury to the passenger which would otherwise result if the passenger strikes the interior of the vehicle that has changed its velocity because of an impact. When the velocity of the vehicle is changed, the passenger is accelerated with respect to the vehicle because the passenger's velocity is not immediately altered by the impact. The passenger is accelerated until he strikes the interior of the vehicle. The inflatable portion of the system is normally packaged from view within the vehicle. In the event that the vehicle experiences an impact of a type which might result in injury to a passenger, the system is activated by an impact sensor. An inflatable bag is inflated to catch and cushion the passenger to prevent him from striking the vehicle's interior.

The successful operation of the restraining system depends upon the ability of the impact sensor to distinguish between the types of impacts which may result in injury to the passengers and the types which are relatively harmless. Commonly known prior art piezoelectric impact sensors have been used in projectile fuzes to detonate the projectile upon impact with a target. However, these sensors cannot be successfully used with an inflatable passenger restraining system. The reason is the inability of the prior art impact sensors to distinguish between the above-mentioned types of impacts. Prior art impact sensors cannot sense the duration of an impact but can only sense the magnitude. For the purpose of preventing injury to a passenger in a vehicle, the impact sensor must examine both the magnitude and duration of any impact suffered by the vehicle since the duration is indicative of the decelerating effect the impact may have on the vehicle. A short duration, high magnitude impact upon the vehicle would cause a prior art impact sensor to become activated, but such an impact could be the result of a minor collision, the result of the vehicle striking a defect in the roadway, or the result of operating vibrations within the vehicle. To prevent an unwarranted and dangerous inflation of a restraining system due to such impacts, the apparatus according to the present invention senses the duration as well as the magnitude of the impact to activate the restraining system only when an impact having sufficient magnitude and duration is experienced by the vehicle.

BRIEF SUMMARY OF THE INVENTION

The present invention is a piezoelectric vehicle impact sensor for use within a vehicle. A piezoelectric crystal which has a sensitive axis is firmly attached within the vehicle. A mass is mounted within the vehicle for compressing the crystal along its sensitive axis in response to changes in the vehicle's velocity that are caused by impacts upon the vehicle from predetermined directions relative to the vehicle. The compression causes the crystal to generate a voltage as a function of the impact. A voltage limiter limits the amplitude of the voltage to a predetermined level. An integrating circuit receives the voltage from the crystal and produces a signal which is an integral of that voltage. A detecting circuit is responsive to a particular value of the signal from the integrating circuit for switching an electric current which may be used to activate a passenger restraining system within the vehicle to prevent injury to the passengers.

DESCRIPTION OF THE PREFERRED EMBODIMENT

Figure 1:
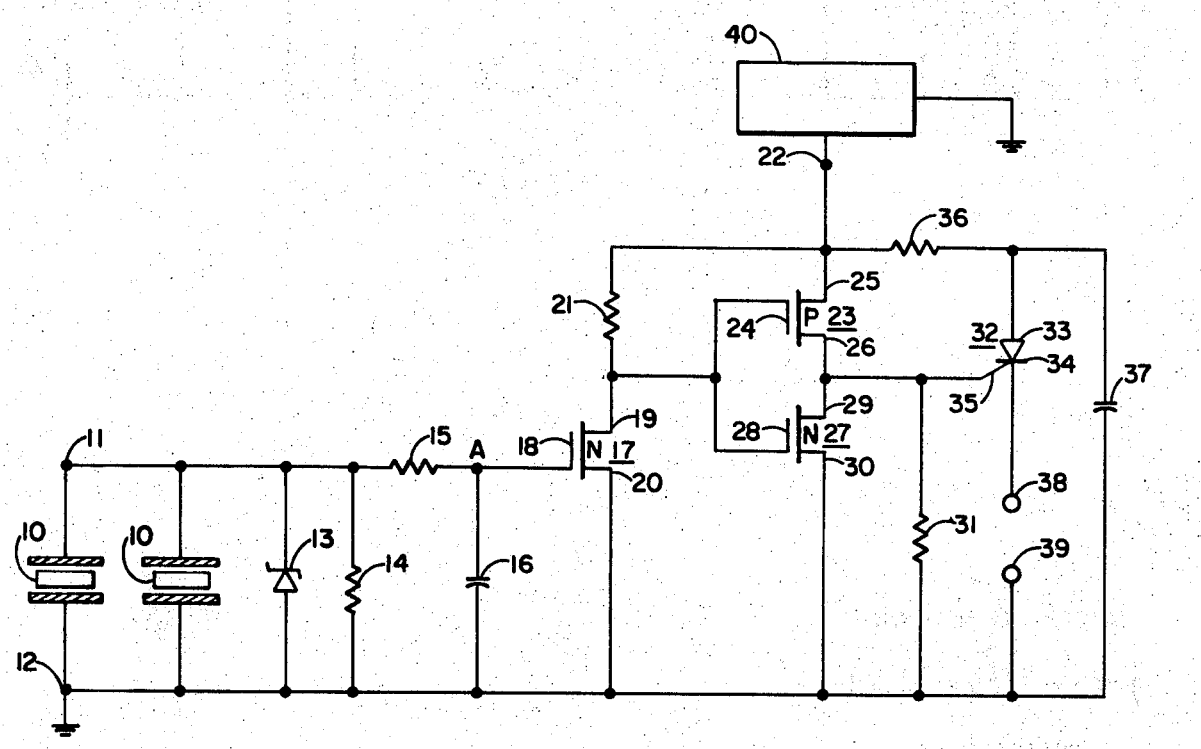
FIG. 1 is a schematic diagram of the preferred embodiment of the present invention.

Referring 3 FIG. 1, the present invention is a piezoelectric vehicle impact sensor in which two piezoelectric crystals 10 are connected in parallel between a terminal 11 and an input terminal 12 to generate a positive voltage at terminal 11 with respect to input terminal 12. A zener diode 13 has its cathode connected to terminal 11 and its anode connected to input terminal 12. A resistor 14 is connected between terminal 11 and input terminal 12.

A gate 18 of an N-channel FET 17, which also has a drain 19 and a source 20, is connected to terminal 11 and input terminal 12 via a resistor 15 and a capacitor 16 respectively. Source 20 is connected to input terminal 12, and drain 19 is connected to an input terminal 22 via a resistor 21. Input terminal 22 is for connection to a positive terminal of a DC voltage source 40 which has its negative terminal connected to input terminal 12.

Drain 19 is connected to a gate 24 of a P-channel FET 23 and also to a gate 28 of an N-channel FET 27. A source 30 of FET 27 is connected to input terminal 12, and a source 25 of FET 23 is connected to input terminal 22. Input terminal 12 is connected via a resistor 31 to a drain 26 of FET 23 and also to a drain 29 of FET 27.

An SCR 32 which has an anode 33, a cathode 34, and a gate 35, is connected to drain 26 via gate 35. Anode 33 is connected to input terminal 22 via a resistor 36 and also to input terminal 12 via a capacitor 37. Output terminals 38 and 39 are connected to cathode 34 and input terminal 12 respectively.

Figure 2:
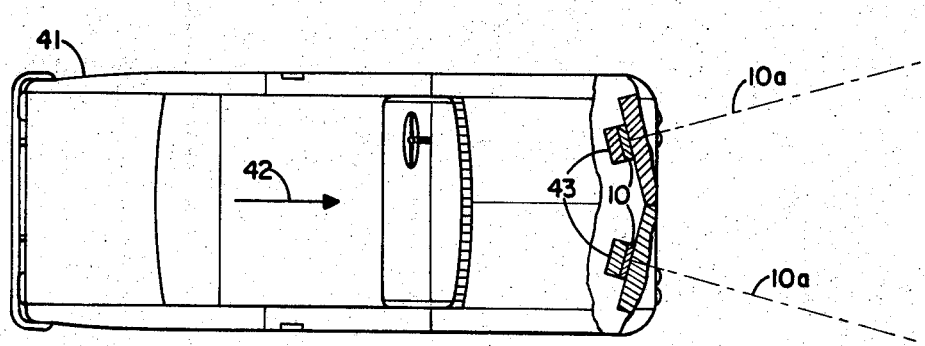
FIG. 2 shows an arrangement of the piezoelectric crystals within a vehicle for sensing impacts from predetermined directions.

Referring to FIG. 2, a passenger vehicle 41 is shown traveling in the direction indicated by arrow 42. Piezoelectric crystals 10 each having a sensitive axis 10a are attached to vehicle 41 to position sensitive axes 10a in directions that are parallel to the major components of the force of an impact from a direction from which it is desired to sense impacts. A mass 43 is mounted to the side of each of crystals 10 opposite the directions from which the impacts will occur for which each of crystals 10 is positioned to sense.

OPERATION

The circuit shown in FIG. 1 becomes operative when one of crystals 10 is compressed against vehicle 41 by the attached mass 43 in response to an impact with vehicle 41 as shown in FIG. 2. Each of crystals 10 is sensitive only to impacts with vehicle 41 that cause the attached mass 43 to compress crystal 10 against vehicle 41 with a component of the compressive force being parallel to sensitive axis 10a of crystal 10.

Piezoelectric crystals 10 respond to a compressive force having a component parallel to sensitive axis 10a to generate a voltage between terminal 11 and input terminal 12. The polarity of the voltage makes terminal 11 positive with respect to input terminal 12. This voltage is introduced to zener diode 13 which limits the amplitude to a predetermined level. Zener diode 13 clips the voltage generated by crystals 10 at a predetermined level due to the reverse breakdown voltage characteristic. The voltage generated by crystals 10 is not affected by zener diode 13 until the reverse breakdown voltage of zener diode 13 is reached. At that predetermined level, zener diode 13 conducts a reverse current that prevents the voltage generated by crystals 10 from exceeding the breakdown voltage.

Figure 3:
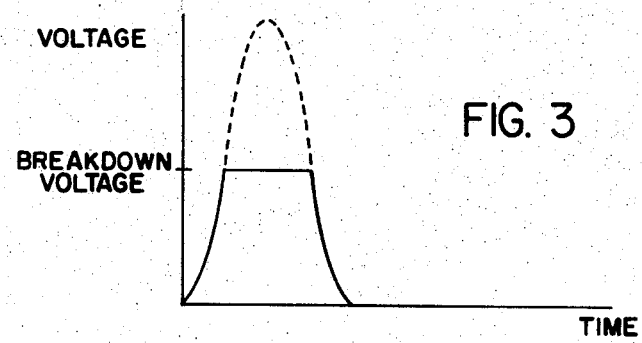
FIG. 3 is a graph of the voltage at terminal 11 with respect to input terminal 12 in the circuit of FIG. 1.
Figure 4:
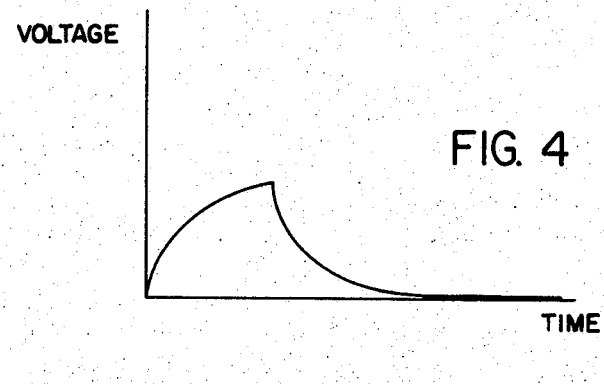
FIG. 4 is a graph of the signal at terminal A with respect to input terminal 12 in the circuit of FIG. 1 which corresponds to the voltage shown in FIG. 3.

The voltage that is limited by zener diode 13 appears across resistor 15 and capacitor 16 that operate as an integrating circuit. Capacitor 16 is charged via resistor 15 to produce a signal which is an integral of the amplitude limited voltage generated by crystals 10. FIG. 4 shows the integral signal which is produced across capacitor 16 in response to the corresponding voltage generated by crystals 10 which is shown in FIG. 3. Resistor 14 provides a discharge path for capacitor 16.

The integral signal is applied across gate 18 and source 20 of FET 17 which operates as a detector. FET 17 is normally nonconductive, but becomes conductive when the integral signal reaches a particular value. Resistor 21 prevents a high current from passing through FET 17. When FET 17 becomes conductive, gates 24 and 28 are connected to input terminal 12. FET 23 is normally nonconductive, and FET 27 is normally conductive since they are opposite conductivity types. But when gates 24 and 28 are connected to input terminal 12 by FET 17, FET 23 becomes conductive and FET 27 becomes nonconductive.

Since gate 35 of SCR 32 is connected to drain 26 and drain 29, the voltage applied to gate 35 depends upon the conductivity of FET 23 and FET 27. The normal conductive state of FET 27 connects gate 35 to input terminal 12 to prevent accidental triggering of SCR 32 due to possible accumulation of charge at gate 35. However, when FET 27 and FET 23 reverse their conductivity in response to FET 17, current flows from DC voltage source 40 through resistor 31. This causes SCR 32 to become conductive because of the positive voltage at gate 35 with respect to cathode 34. When SCR 32 is conductive, a current is allowed to pass through output terminals 38 and 39. The source of this current is capacitor 37 which is charged via resistor 36 by DC voltage source 40. Resistor 36 also serves as a safety to prevent a high current from passing through output terminals 38 and 39 in the event SCR 32 has malfunctioned to become conductive prior to the time DC voltage source 40 is connected to input terminal 22 and therefore, prior to capacitor 37 becoming fully charged. This prevents a load such as a detonator from being fired unintentionally by a faulty SCR 32.

In summary, the present invention conducts a current from capacitor 37 through output terminals 38 and 39 only if FET 17 switches from a normally nonconductive state to a conductive state. The conductivity of FET 17 depends upon the nature of the voltage generated by piezoelectric crystals 10 in response to impacts upon the vehicle from the predetermined directions relative to the vehicle. The voltages are introduced to zener diode 13, resistors 14 and 15, and capacitor 16 which clip the voltage from crystals 10 at the breakdown voltage of zener diode 13 and produce an integral signal across capacitor 16 that is the integral of the voltage generated by crystals 10. The reason for clipping the voltage from crystals 10 is to eliminate any response by the sensor to very high amplitude, short duration voltages caused by impacts of the same character. This allows the present invention to function as an impact sensor for activating an inflatable passenger restraining system because of the ability to distinguish between short-duration, noninjurious impacts and longer duration impacts which could cause injury to the passenger. The present piezoelectric vehicle impact sensor is designed to avoid an unwarranted activation of the restraining system due to minor impacts.

The embodiment disclosed in the preceding specification is preferred. However, variations in the arrangement and structure of the circuit disclosed by the preceding specification may be apparent to one of ordinary skill in the art which would not depart from the principle and scope of the present invention. A plurality of piezoelectric crystals and masses for compressing those crystals could be used to sense impacts from a greater number of directions, or single crystals with mechanical lever techniques for applying the mass forces to the crystal could be used to obtain a plurality of directions. Also, a plurality of detecting circuits could be connected in parallel to increase the reliability of the sensor.

I claim as my invention:

1. A piezoelectric vehicle impact sensor responsive to changes in the vehicle's velocity caused by particular impacts upon the vehicle from predetermined directions relative to the vehicle comprising:
   a piezoelectric crystal having a sensitive axis, said crystal being attached to said vehicle;
   compressing means attached to said vehicle for compressing said crystal along said sensitive axis in response to impacts upon said vehicle from said predetermined directions, thereby causing said crystal to generate a voltage as a function of said impacts;
   voltage limiting means connected to said crystal for limiting the amplitude of said voltage to a predetermined level;
   integrating means connected to said voltage limiting means for producing a signal which is an integral of said voltage received from said voltage limiting means;
   first and second input terminals for connection to a voltage source;
   first and second output terminals; and
   detecting means connected to said integrating means, said output terminals, and said input terminals, said detecting means being responsive to a particular value of said signal for conducting a current through said output terminals.

2. The piezoelectric vehicle impact sensor of claim 1 wherein a plurality of piezoelectric crystals and compressing means are used, each of said crystals being positioned to sense impacts from different directions.

3. The piezoelectric vehicle impact sensor of claim 2 wherein said voltage limiting means comprises a zener diode.

4. The piezoelectric vehicle impact sensor of claim 3 wherein said integrating means comprises:
a first impedance;
a capacitor connected to said first impedance, said capacitor and said first impedance being connected in parallel with said zener diode; and
a second impedance connected in parallel with said capacitor and said first impedance.

5. The piezoelectric vehicle impact sensor of claim 4 wherein said detecting means comprises:
first semiconductor switching means connected to said capacitor in said integrating means, said first semiconductor switching means being responsive to a particular value of said signal for becoming conductive;
a third impedance connected between said first semiconductor switching means and said first input terminal;
a fourth impedance connected to said second input terminal;
second semiconductor switching means connected between said first and second input terminals and further connected to said first semiconductor switching means and to said fourth impedance, said second semiconductor switching means being responsive to said first semiconductor switching means becoming conductive for conducting a current through said fourth impedance;
a fifth impedance connected to said first input terminal;
capacitive storage means connected in series with said fifth impedance between said first input terminal and said second output terminal;
means connecting said second input terminal to said first semiconductor switching means and to said second output terminal; and
third semiconductor switching means connected to said capacitive storage means, to said first output terminal, and to said fourth impedance, said third semiconductor switching means being responsive to a current through said fourth impedance to conduct a current from said capacitive storage means through said first and second output terminals.

6. The piezoelectric vehicle impact sensor of claim 5 wherein said first, second, and third semiconductor switching means comprise an N-channel field effect transistor, a pair of opposite conductivity type field effect transistors, and a silicon controlled rectifier, respectively.

* * * * *